United States Patent
Hodrus

(10) Patent No.: US 11,378,143 B2
(45) Date of Patent: Jul. 5, 2022

(54) METHOD FOR SETTING A PREDEFINED POSITION OF A CLUTCH ACTUATOR WHICH COMPRISES A FRICTION SPRING ELEMENT

(71) Applicant: Schaeffler Technologies AG & Co. KG, Herzogenaurach (DE)

(72) Inventor: Erhard Hodrus, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/284,802

(22) PCT Filed: Oct. 22, 2019

(86) PCT No.: PCT/DE2019/100919
§ 371 (c)(1),
(2) Date: Apr. 13, 2021

(87) PCT Pub. No.: WO2020/094180
PCT Pub. Date: May 14, 2020

(65) Prior Publication Data
US 2021/0341023 A1 Nov. 4, 2021

(30) Foreign Application Priority Data
Nov. 6, 2018 (DE) .......................... 102018127641.9

(51) Int. Cl.
*F16D 48/06* (2006.01)
*F16D 23/12* (2006.01)

(52) U.S. Cl.
CPC ........... *F16D 48/064* (2013.01); *F16D 23/12* (2013.01); *F16D 2500/1025* (2013.01); *F16D 2500/3026* (2013.01); *F16D 2500/5012* (2013.01); *F16D 2500/5018* (2013.01); *F16D 2500/7041* (2013.01); *F16D 2500/70235* (2013.01); *F16D 2500/70605* (2013.01)

(58) Field of Classification Search
None
See application file for complete search history.

(56) References Cited

U.S. PATENT DOCUMENTS

2004/0128051 A1* 7/2004 Boll ...................... F16D 48/066
701/67

FOREIGN PATENT DOCUMENTS

DE 102009027907 1/2011
DE 102011011152 9/2011
(Continued)

*Primary Examiner* — Timothy Hannon

(57) ABSTRACT

A method sets a predefined position of a clutch actuator comprising a friction spring element. An activation path of the clutch actuator that actuates the clutch is predefined by a coupling torque via a coupling characteristic curve, wherein the predefined position (zo, zu) to be assumed by the clutch actuator is set by a closed-loop controller. To enable the predefined position of the clutch actuator to be set precisely without using additional energy, the predefined position (zo, zu) is corrected by a turning back value (ro, ru) of the friction spring element and the corrected position (zo+ro; zu−ru) of the clutch actuator is approached by the closed-loop controller. After reaching the corrected position (zo+ro; zu−ru) the closed-loop controller is switched off by dissipating the potential energy stored in the friction spring element.

15 Claims, 2 Drawing Sheets

(56) References Cited

FOREIGN PATENT DOCUMENTS

| DE | 102016210190 A1 | * | 12/2016 | ......... F16H 25/2252 |
|----|-----------------|---|---------|------------------------|
| DE | 102016222149    |   | 5/2017  |                        |
| DE | 102015226537    |   | 6/2017  |                        |
| DE | 102017111966 A1 |   | 12/2018 |                        |
| EP | 2607208 A2      | * | 6/2013  | ......... F16H 25/2454 |

* cited by examiner

METHOD FOR SETTING A PREDEFINED POSITION OF A CLUTCH ACTUATOR WHICH COMPRISES A FRICTION SPRING ELEMENT

CROSS-REFERENCE TO RELATED APPLICATIONS

This application is the U.S. National Phase of PCT Appln. No. PCT/DE2019/100919 filed Oct. 22, 2019, which claims priority to DE 102018127641.9 filed Nov. 6, 2018, the entire disclosures of which are incorporated by reference herein.

TECHNICAL FIELD

The disclosure relates to a method for setting a predefined position of a clutch actuator comprising a friction spring element, in which an activation path of the clutch actuator that actuates the clutch is predefined by a coupling torque via a coupling characteristic curve, wherein the predefined position to be assumed by the clutch actuator is set by a closed-loop controller.

BACKGROUND

A method for controlling a friction clutch is known from DE 10 2011 011 152 A1, wherein the friction clutch is arranged between an internal combustion engine and a transmission and, by means of an actuating element, the friction clutch is driven along an activation path of a clutch actuator that is axially actuated and that is assigned to a target torque that can be transmitted via the friction clutch via a coupling characteristic curve. The hysteresis occurring between the target torque and the actual torque actually transmitted via the friction clutch along the activation path is compensated for by correcting an actual value determined for controlling the clutch actuator by means of a correction variable.

To be able to switch off the clutch actuator at a defined position, it is known to define a holding voltage for the electric motor actuating the clutch actuator by means of a closed-loop controller hysteresis. If the distance between the target position and the actual position is smaller than the closed-loop controller switch-off hysteresis, the closed-loop controller switches off. If the actuator is passively pushed out of the position, the closed-loop controller switches on again after the closed-loop controller switch-on hysteresis has been reached. The holding voltage, which is a pre-control voltage, is superimposed on the closed-loop controller and can be adapted by the unintentional restart of the closed-loop controller.

Clutch actuators are known which use a wrap spring which is arranged on the clutch actuator to increase the friction in the clutch actuator. The aim here is to be able to hold the clutch actuator in a defined position, wherein the output stages of the control unit driving the electric motor are switched off, which minimizes the energy requirement of the clutch actuator in the holding phases.

If such a clutch actuator comprising a wrap spring is operated with the described closed-loop controller hysteresis, this leads to an unintentional back and forth movement of the clutch actuator, since the target position is adjusted and the closed-loop controller switches itself off. However, the wrap spring pushes the clutch actuator back again, whereupon the closed-loop controller switches on again and adjusts the target position again. If the clutch actuator is moved to the "clutch closed" position, the tensioned wrap spring presses the clutch actuator back slightly so that the clutch cannot transmit the maximum coupling torque. In the opposite "clutch open" position, it is pushed back slightly after the position has been set, which can lead to inadvertent drag torques.

SUMMARY

It is desirable to specify a method for setting a predefined position of a clutch actuator, in which a precise setting of the predefined position is possible without an additional input of energy.

The predefined position is corrected by a turning back value of the friction spring element and the corrected position of the clutch actuator is approached by the closed-loop controller, wherein after the corrected position has been reached, the closed-loop controller for setting the predefined position is switched off by dissipating the potential energy stored in the friction spring element. This has the advantage that due to the very large scatter of the friction spring element, such as wrap springs, in a clutch actuator that is used, the clutch actuator position required to control the clutch can always be reliably set. This eliminates the need for measures to narrow the tolerance band of the friction spring element. The desired position is assumed by the clutch actuator, wherein the friction spring element is able to use the holding force thereof without the need for additional expenditure of energy for a long time.

The turning back value of the friction spring element is advantageously determined in an initialization phase, advantageously at the end of production of the clutch actuator, in that the closed-loop controller is moved to the specified position and a difference between the position actually assumed by the clutch actuator and the predefined position is determined and stored in a non-volatile manner. By using the turning back value as a correction factor during operation of the clutch, the exact coupling torque that was requested is always transmitted.

In one embodiment, the stored turning back value of the friction spring element is added or subtracted from the predefined position of the clutch actuator as a correction factor in clutch operation. Subtraction and addition depend on whether the specified position serves to control the "clutch closed" or "clutch open" position.

In one variant, the stored turning back value of the friction spring element is checked after the predefined position has been repeatedly set. This ensures at all times that the correct correction value is added to or subtracted from the specified position. A change in the turning back value of the friction spring element during the service life of the clutch actuator is thus reliably detected.

In one embodiment, the stored turning back value is adapted during clutch operation. System changes in the clutch actuator due to the service life and changes within the clutch system as a result of temperature fluctuations can thus be taken into account at any time when determining the turning back value of the wrap spring.

In a further development, the position actually approached by the clutch actuator is compared with the predefined position during clutch operation and, when a further difference is detected between the actual position approached and the predefined position, the stored turning back value is corrected by the further difference. In this way, the adaptation of the turning back value of the friction spring element can be carried out during the clutch operation.

The positions "clutch open" or "clutch closed" are advantageously used as the predefined position of the clutch actuator. This ensures that no drag torque whatsoever occurs in the "clutch open" position, while the maximum coupling torque is always transmitted in the "clutch closed" position.

In one embodiment, the closed-loop controller is switched on again when a new predefined position is set. Thus, a correction value is determined for each new target value of the closed-loop controller to be set, wherein the closed-loop controller is switched on again when approaching the newly predefined position, and after the correction of the approaching predefined position, the closed-loop controller is switched off again to be able to reliably set the desired new predefined position.

In a further variant, the closed-loop controller continues continuously when the clutch actuator is in a predefined position between the "clutch open" and "clutch closed" positions. This has the advantage that a permitted overshoot of the friction spring element is possible in this position without the coupling torque changing unfavorably.

In a particularly cost-effective variant, the friction spring element is designed as a wrap spring.

BRIEF DESCRIPTION OF THE DRAWINGS

One possible embodiment will be explained in more detail with reference to the figures shown in the drawing, wherein.

DETAILED DESCRIPTION

In clutch systems that comprise, for example, a modular clutch actuator, a wrap spring is used that is fastened in the clutch actuator to increase the friction in the clutch actuator and thus to be able to hold the clutch actuator in a defined position without an increased energy requirement being necessary because due to the use of the wrap spring, the power output stages of an electric motor controlling the clutch actuator can be switched off.

Figure 1:
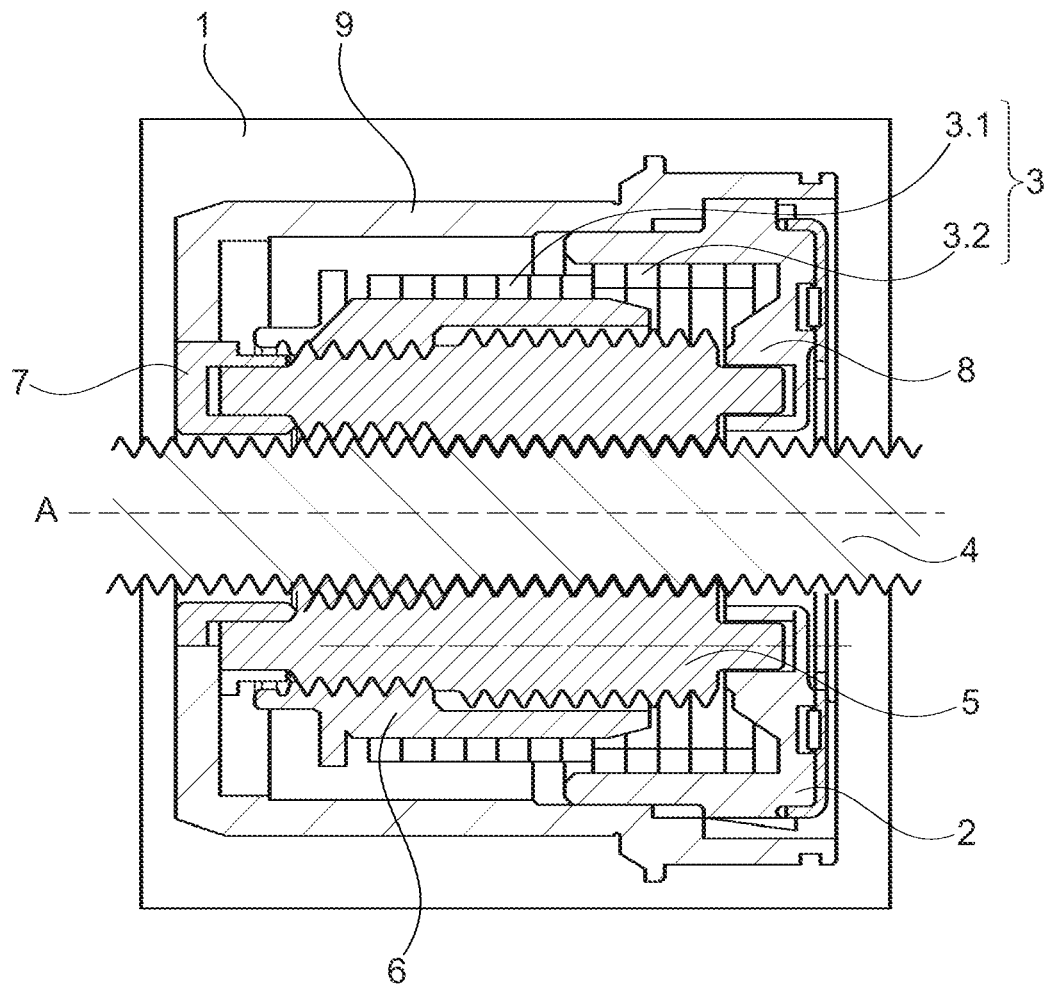
FIG. 1 shows an exemplary embodiment of a planetary roller screw drive of a clutch actuator for carrying out the method.

FIG. 1 shows an exemplary embodiment of a planetary roller screw drive of such a clutch actuator. The clutch actuator 1 comprises the planetary roller screw drive 2 with the wrap spring 3 serving as a friction element. A plurality of planetary rollers 5 of the planetary roller screw drive 2 are engaged with a profile of a spindle 4, and mesh with a ring gear 6 surrounding the planetary rollers 5. The planetary rollers 5 run axially in parallel to the longitudinal axis A of the spindle 4, and are mounted at the two ends thereof in a first planetary roller carrier 7 and a second planetary roller carrier 8. The planetary roller carriers 7, 8 are supported in a sleeve 9 surrounding the ring gear 6 in a rotationally fixed manner relative to the latter. The sleeve 9 and planetary roller carrier 7, 8 are axially fixed and non-rotatably connected to a rotor of an electric motor (not shown further). During the rotation of the rotor and the planetary roller carrier 7, 8 supported in the sleeve 9, the spindle 4 performs an axial stroke, as a result of which a coupling, not shown, is opened or closed.

The wrap spring 3 is arranged between the ring gear 6 and the second planetary roller carrier 8 to influence the efficiency when the different components rotate relative to each other. It consists of a first wrap spring region 3.1 and a second wrap spring region 3.2, wherein the first wrap spring region 3.1 is in operative connection with the ring gear 6 and the second wrap spring region 3.2 is in operative connection with the second planetary roller carrier 8. While the second planetary roller carrier 8 is fixed to the frame, the ring gear 6 is driven in rotation. The rotary drive takes place frictionally from the planetary rollers 5.

Figure 2:
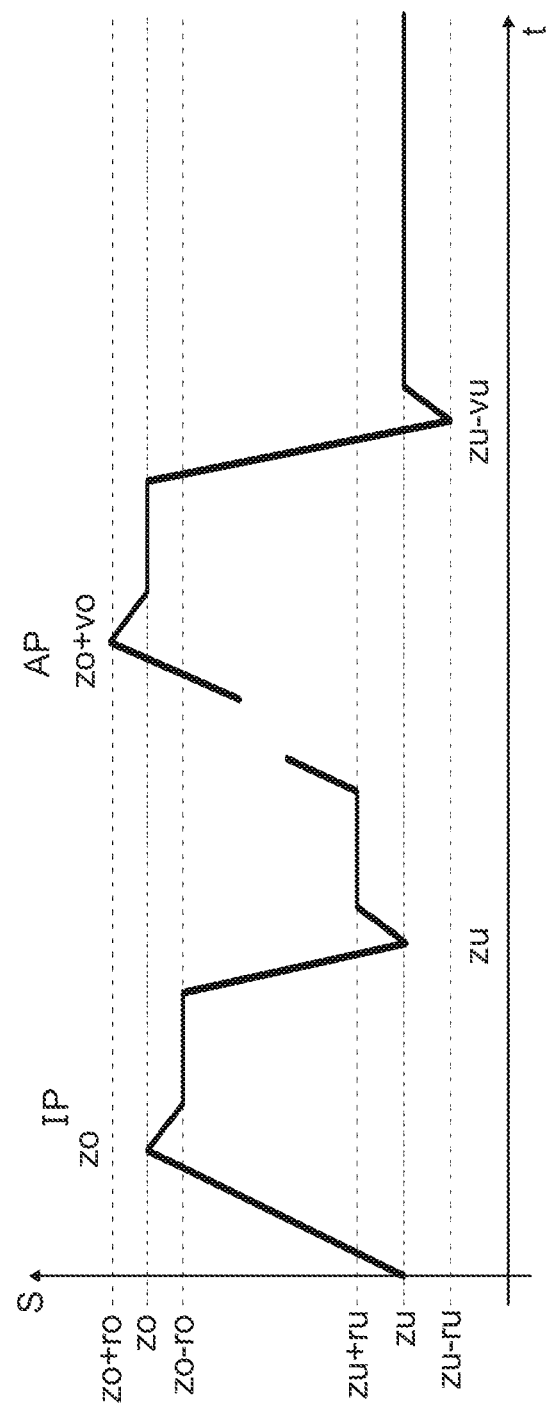
FIG. 2: shows an exemplary embodiment of the method.

A method of controlling the actuator of FIG. 1 is illustrated in FIG. 2. An actuator travel s of the clutch actuator 1 is shown as a function of time t. A predefined position of the clutch actuator 1 is controlled in an initialization phase IP, which is carried out, for example, at the end of the production line of the clutch actuator, by means of a position regulator controlling the electric motor. A predefined position zo is approached by the clutch actuator 1. After this predefined position zo has been set, the position actually assumed by the clutch actuator 1 is determined. If the clutch actuator 1 assumes a position other than the desired predefined position zo, a correction factor is determined from this difference between the predefined zo and the actually set position, which represents a reverse rotation factor ro of the wrap spring 3, since due to the potential energy stored therein the wrap spring 3 moves the clutch actuator 1 after setting the predefined position zo and holds it in the changed position after dissipating the potential energy inherent therein.

The reverse rotation factor ru determined in an analogous way is stored in the position controller in a non-volatile manner and is available in an application phase AP of the clutch actuator 1, i.e., in the operating state of the clutch. If a predefined position zo or zu is now to be set by the closed-loop controller in the operating state of the clutch, the control is based on a corrected position of zo+ro. When controlling the electric motor in the opposite direction, the corrected position is zu−ru. When activating the "clutch open" position, the position controller moves to the corrected position zo+ro, while when activating the "clutch closed" position, clutch actuator 1 is moved to the corrected position zu−ru. The closed-loop controller is then switched off. Due to the potential energy inherent in the wrap spring 3, the clutch actuator 1 is moved from the corrected position zo+ro or zu−ru to the predefined position zo or zu and held in this position by the wrap spring 3.

For better understanding, the method will be explained using a numerical example. For example, if the clutch is to be fully closed, the clutch actuator must approach the position zu=0 mm. The reverse rotation factor of the wrap spring 3 determined during the initialization phase IP is ru=0.3 mm. This means that after the position controller has been switched off, the clutch comes to a standstill at 0.3 mm instead of 0 mm. If the specified position is now corrected by the reverse rotation factor ru, the 0 mm position zu is reduced by the 0.3 mm reverse rotation factor ru when the clutch actuator is next approached. The corrected position to be approached is therefore zu−ru=−0.3 mm. The position controller is switched off after approaching the corrected position to save energy. The reverse rotation inherent in the wrap spring 3 achieves the originally desired position zu=0 mm.

During the operating phase of the clutch (application phase AP), the reverse rotation factor ro, ru can also be adapted when controlling the clutch position "clutch open" or "clutch closed" by performing a check of whether the clutch actuator 1 really moves to the desired further corrected position when approaching the corrected positions zo+ro or zu−ru. If there is a further difference ro1 or ru1 between the current position approached during the application phase AP and the corrected position zo+ro or zu−ru, then this is added to or subtracted from the already corrected position, so that the further corrected position zo+ro+ro1 or zu+ru+ru1 is determined one more time while the clutch is in operation. If these adaptations are assigned to system changes during the service life, or to temperature influences, the application phase AP is to be equated with a new initialization phase IP.

For the closed position 0 mm of the clutch, it should be noted that the now permitted overshoot (backward rotation) of the wrap spring 3 of the clutch actuator 1 must not take place below a certain limit, as otherwise a partial opening of a sniffing hole of a hydrostatic clutch actuation system can occur. For the "clutch open" position, it must be ensured that the system does not move to too high a position, as otherwise the slave cylinder of the hydrostatic clutch actuation system that controls the clutch can be overridden.

LIST OF REFERENCE SYMBOLS

1 Clutch actuator
2 Planetary roller screw drive
3 Wrap spring
3.1 Wrap spring region
3.2 Wrap spring region
4 Spindle
5 Planetary roller
6 Ring gear
7 Planetary roller carrier
8 Planetary roller carrier
9 Sleeve
zo Predefined position
zu Predefined position
ro Turning back factor of the wrap spring
ru Turning back factor of the wrap spring
zo+ro Corrected position
zu−ru Corrected position
IP Initialization phase
AP Application phase

The invention claimed is:

1. A method for setting a predefined position of a clutch actuator comprising a friction spring element, in which an activation path of the clutch actuator that actuates the clutch is predefined by a coupling torque via a coupling characteristic curve, wherein the predefined position to be assumed by the clutch actuator is set by a closed-loop controller, wherein the predefined position is corrected by a turning back value of the friction spring element and the corrected position of the clutch actuator is approached by the closed-loop controller, wherein after reaching the corrected position the closed-loop controller for setting the predefined position is switched off by dissipating the potential energy stored in the friction spring element, wherein the turning back value of the friction spring element is determined in an initialization phase in which the predefined position is approached by the closed-loop controller and a difference between the position actually assumed by the clutch actuator and the predefined position is determined and stored in a non-volatile manner.

2. The method according to claim 1, wherein in clutch operation, the stored turning back value of the friction spring element is added or subtracted as a correction factor to the predefined position of the clutch actuator.

3. The method according to one of claim 1, wherein the turning back value of the friction spring element is checked after repeatedly setting the predefined position.

4. The method according to claim 1, wherein the stored turning back value is adapted during clutch operation.

5. The method according to claim 4, wherein during clutch operation the position actually approached by the clutch actuator is compared with the corrected position and, when a further difference between the actually approached position and the corrected position is detected, the stored turning back value is corrected by the further difference.

6. The method according to claim 1, wherein the predefined position of the clutch actuator is a clutch open position or a clutch closed positions.

7. The method according to claim 1, wherein the closed-loop controller is switched on again after a new predefined position of the clutch actuator has been specified.

8. The method according to claim 1, wherein while the predefined position of the clutch actuator lies between a clutch open position and a clutch closed, the closed-loop controller continues in a continuous manner.

9. The method according to claim 1, wherein the friction spring element is a wrap spring.

10. A method of controlling a clutch comprising:
in an initialization phase, moving a clutch actuator to a predefined clutch closed position, switching off the clutch actuator, measuring a first turning back value, and storing the first turning back value in a non-volatile memory; and
in an application phase, in response to a command to close the clutch, moving the clutch actuator past the predefined clutch closed position by an amount equal to the stored first turning back value and then switching off the clutch actuator.

11. The method of claim 10, further comprising:
in the initialization phase, moving the clutch actuator to a predefined clutch open position, switching off the clutch actuator, measuring a second turning back value, and storing the second turning back value in the non-volatile memory; and
in the application phase, in response to a command to open the clutch, moving the clutch actuator past the predefined clutch open position by an amount equal to the stored second turning back value and then switching off the clutch actuator.

12. The method of claim 10, further comprising:
in the application phase, after switching off the clutch actuator, measuring a difference between a current actuator position and the predefined clutch closed position, and adjusting the stored first turning back value by an amount equal to the difference.

13. A method of controlling a clutch comprising:
in an initialization phase, moving a clutch actuator to a predefined clutch open position, switching off the clutch actuator, measuring a turning back value, and storing the turning back value in a non-volatile memory; and
in an application phase, in response to a command to open the clutch, moving the clutch actuator past the predefined clutch open position by an amount equal to the stored turning back value and then switching off the clutch actuator.

14. The method of claim 13, further comprising:
in the application phase, after switching off the clutch actuator, measuring a difference between a current actuator position and the predefined clutch open position, and adjusting the stored turning back value by an amount equal to the difference.

15. A method for setting a predefined position of a clutch actuator comprising a friction spring element, in which an activation path of the clutch actuator that actuates the clutch is predefined by a coupling torque via a coupling characteristic curve, wherein the predefined position to be assumed by the clutch actuator is set by a closed-loop controller, wherein the predefined position is corrected by a turning back value of the friction spring element and the corrected position of the clutch actuator is approached by the closed-loop controller, wherein after reaching the corrected position the closed-loop controller for setting the predefined position is switched off by dissipating the potential energy stored in the friction spring element, wherein the friction spring element is a wrap spring.

* * * * *